3,245,300
SLICING APPARATUS
Mark Hasten, Minneapolis, and Clifton H. Morrison, St. Paul, Minn., assignors to General Mills, Inc., a corporation of Delaware
Filed Dec. 2, 1963, Ser. No. 327,305
4 Claims. (Cl. 83—355)

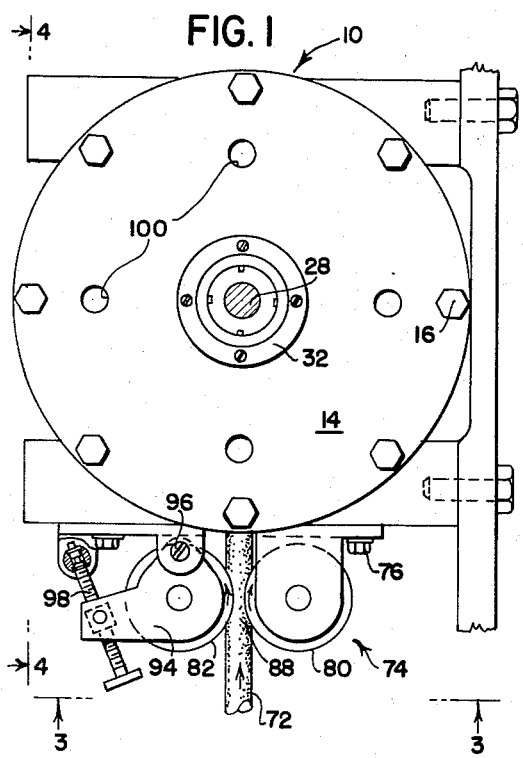
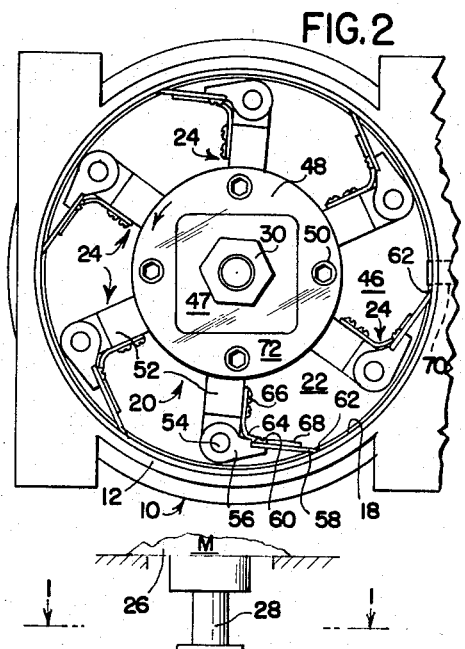
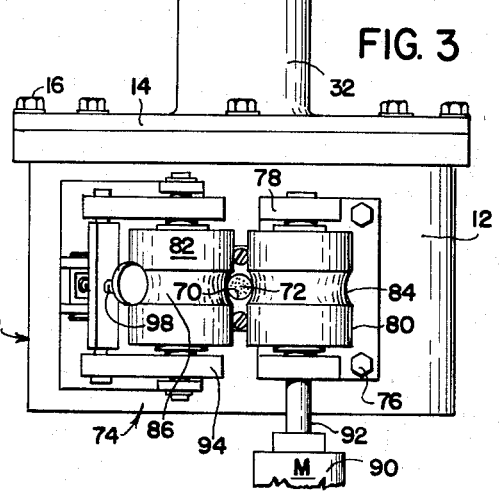
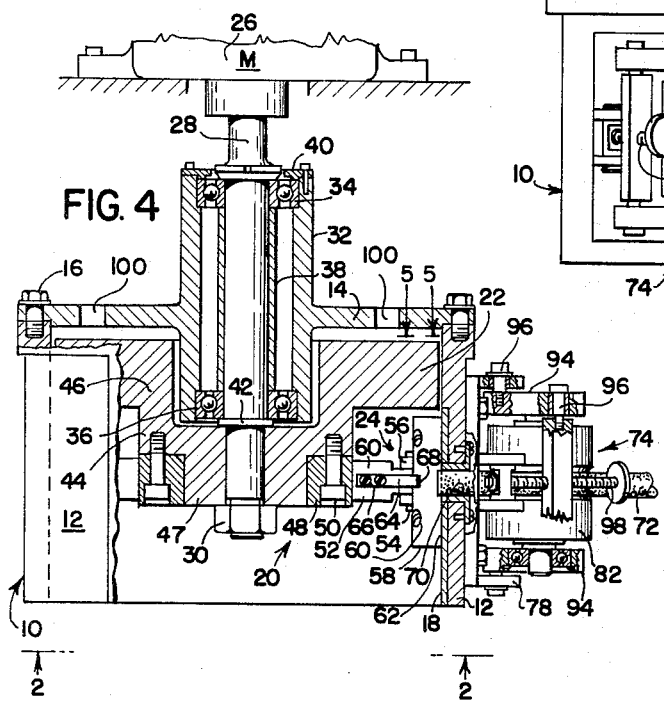
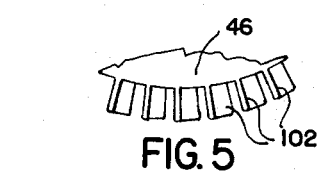
INVENTORS
MARK HASTEN
CLIFTON H. MORRISON
BY Robert B. Hughes
ATTORNEY

United States Patent Office 3,245,300
Patented Apr. 12, 1966

This invention relates to a slicer, and more particularly to a high-speed rotary slicer especially adapted for use in slicing a material such as cooked dough.

The apparatus of the present invention was designed for use in a process such as that described in U.S. Patent No. 2,858,219. In this process an extruded "rope" of cooked dough, made up of a plurality of partially fused strands, is cut into wafers, each of which is then further processed to make a finished cereal flake. Obviously, the apparatus to accomplish this slicing operation on a commercial basis must make these cuts at a very rapid rate, and the slicing must be done in such a manner that the dough wafers are not deformed to any appreciable degree from the general cross-sectional configuration of the extruded dough rope.

Accordingly, it is an object to provide an improved high speed rotary slicer, and also to provide a slicer especially adapted for use as in the above recited slicing operation.

It is a further object to provide such a slicer well adapted for a commercial operation. Thus it is an object to provide a simple, economical, compact, durable, and efficient slicer, which will properly and reliably perform its slicing function, especially with respect to a dough-like material, which has low maintenance requirements, and which can readily be incorporated with other apparatus as part of a high production commercial operation such as that indicated above.

These and other objects and features of the invention will be more readily understood and appreciated from the following detailed description of the preferred embodiment thereof selected for purposes of illustration and shown in the accompanying drawing, in which:

FIGURE 1 is a top plan view of the slicer of the present invention, this view being taken from a horizontal plane located below the power unit of the apparatus, this plane being indicated at 1—1 of FIGURE 3;

FIGURE 2 is a bottom plan view of the apparatus of the present invention;

FIGURE 3 is a side elevational view thereof, taken generally from the plane indicated at 3—3 in FIGURE 1;

FIGURE 4 is a side elevational view taken partially in section on line 4—4 of FIGURE 1, this view also illustrating the power unit shown in FIGURE 3;

FIGURE 5 is a fragmentary view of a modification of the fly wheel of the present invention, as it would be seen from the vantage point illustrated at 5—5 of FIGURE 4.

As illustrated in the accompanying drawings, there is a cutter housing 10 comprising a cylindrical side wall 12 and a top cover plate 14 bolted thereto at 16, with the cylindrical inner surface 18 of the side wall 12 defining a vertically aligned cylindrical bore or chamber. Concentrically mounted for rotary motion within the cavity or bore defined by the housing 10 is a cutter assembly, generally designated 20, comprising a fly wheel member 22 and a plurality (six, as shown herein) of cutters 24 mounted thereto. The cutter assembly 20 is driven from a surmounting motor 26 through a vertical drive shaft 28, extending down through and concentric with the fly wheel 22, and fixedly secured by its lower end thereto by means of a nut 30.

To accommodate the drive shaft 28, the middle portion of the top cover 14 is formed with a drive housing 32, in which the shaft 28 is rotatably mounted by upper and lower bearings 34 and 36, respectively, separated by a spacing sleeve 38. The bearings 34 and 36 are retained in the drive housing 32 by means of an upper retaining ring 40 bolted to the housing 32 and a lower collar or circumferential flange 42 formed integrally with the drive shaft 28 near the lower end thereof. The nut 30 by pressing the fly wheel 22 upwardly against this shaft flange 42, effectively locks the fly wheel 22 to the shaft 28 so that it can be rotated thereby.

Although the fly wheel 22 is integral, it may be considered as comprising two portions, namely, an inner hub 44 by which it is fixed to the shaft 22 and from which the cutters 24 are mounted, and a wheel portion 46, located above and outwardly from the hub portion 44 and positioned in the upper part of the bore of the housing 10. The lower peripheral portion 47 of the hub 44 has a square configuration and has mounted therearound a mounting ring 48 fixed to the hub 44 by bolts 50. Each cutter unit 24 comprises a mounting arm 52 which is welded by its root end to the ring 48.

There is pivotally mounted to the outer end portion of each cutter arm 52 by means of a respective vertical hinge pin 54 a related knife mount 56, to which a vertically disposed knife blade 58 is removably secured, as by screws 60. Each cutter unit 24 is so arranged that the plane of its knife blade 58 makes an approximate right angle with its related cutter arm 52, with the vertical cutting edge 62 of each blade 58 being directed forwardly from (i.e. in the direction of rotation of) its related cutter arm 52. Each knife blade 58 is urged outwardly by means of a respective leaf spring 64 which is screwed by one end at 66 to its related arm 52 and presses with its free end 68 against the inner face of its knife blade 58. Thus the cutting edge 62 of each knife blade 58 bears against the inner surface 18 of the housing side wall 12, and rides therealong as the cutter assembly 20 rotates within this housing 10. As can be seen by examining FIGURE 2, the plane of each knife blade 58 makes an angle with the side wall's inner surface 18 (more precisely, makes an angle with a plane tangent with the inner side wall surface 18 at the point where a related cutting edge 62 makes contact therewith) of about 30°.

There is formed in the side wall 12 at the same height as the cutter units 24, a feed hole 70 through which the material to be cut is fed. This hole 70 is perpendicular to the surface 18 (i.e. perpendicular to a plane tangent to the surface 18 at the location of the hole 70). This material to be cut is assumed herein to be a "rope" of cooked dough which is to be cut into moderately thin wafers. The dough, shown at 72, is fed through the opening 70 toward the interior of the housing 10 by means of a feed mechanism, generally designated 74, bolted as at 76 to the side of the housing 10 adjacent the feed opening 70.

This feed mechanism 74 comprises a mounting frame 78 carrying two vertically disposed, side by side feed rollers 80 and 82. These rollers 80 and 82 are formed with matching circumferential grooves 84 and 86, respectively, located at the same elevation as the feed opening 70, and the rollers 80 and 82 are so positioned that these grooves 84 and 86, where nearest one another, define a feed path 88 aligned with the feed opening 70.

The vertical axis of rotation of one roller 80 is fixed with respect to the frame 78, and is driven by a motor 90 through a shaft 92 so as to function as a drive roller. The other roller 82 is a guide roller, and is carried by a bracket 94 swing mounted about a vertical pin 96 from the frame 78. A screw adjusting device, generally designated 98, is provided for the bracket 94 so that the angular position thereof can be shifted to thus change the width of the feed path 88 defined by the roller grooves 84 and 86 to accommodate different thicknesses of material which is to be cut. As illustrated in FIGURE 3, the grooves 84 and 86 are serrated to better engage the material 72 to be fed into the cutter.

In operation, the motor 26 turns the cutter assembly 20 at a relatively high speed (e.g. up to 3600 revolutions per minute) in the same direction as that in which the cutting edges 62 of the several knife blades 58 are directed. The centrifugal force created by the rotary motion of the cutting assembly 20 presses the cutting edges 62 of the blades 58 against the bore surface 18. The other motor 90 turns the drive roller 80, so that as the "rope" of dough 72 is inserted into the feed path 88 defined by the grooves 84 and 86 of, respectively, the rollers 80 and 82, the drive roller 80 cooperating with the idler roller 82 moves the dough 72 into the feed opening 70.

As each knife blade 58, with its cutting edge 62 pressing against the bore surface 18, passes by the feed opening 70, that portion of the dough 72 which, by the action of the feed mechanism 74, has just been projected a short distance inwardly beyond the bore surface 18, is sliced off cleanly, and with substantially no deformation thereof. It is apparent that the feed rate of the feed mechanism 74 (which, of course, depends upon the speed of rotation of the rollers 80 and 82) is adjusted according to the number of cutter units 24, the rotational speed of the cutter assembly 20, and the desired thickness of the slices to be cut from the dough material 72. As each slice of dough material 72 is cut at the feed opening 70, it drops through the open bottom of the housing 10 into a suitable collector and is carried away for further processing.

It will be noted that the cover 14 of the housing 10 is formed with a number of through holes 100 to permit the circulation of air through the cover 14 around the edge of the fly wheel 22 and out the bottom of the housing 10. It has been found that the action of the cutter assembly 20 facilitates this downward air flow which acts on the slices or wafers cut from the dough 72 to speed their discharge out the open bottom of the housing 10.

If it is desired to discharge the cut material at a faster rate, the wheel portion 46 of the fly wheel 22 can be formed with a number of blades 102 (as illustrated in FIGURE 5) so as to force air downwardly through the interior of the housing 10 at a faster rate. As shown herein, this is accomplished by forming the blades 102 about the periphery of the wheel portion 46 of the fly wheel 22.

It can be seen from the operation of this apparatus that the leaf springs 64 of the cutter units 24 serve mainly a locating function to keep the blades 58 positioned against the bore surface 18 while the cutter assembly 20 is rotating at slower speeds in starting or stopping. At higher speeds, the centrifugal force exerted against the blades 58 causes them to maintain good contact against the bore surface 18. This same action of the blades 58 against the bore surface 18 maintains the desired sharpness of the cutting edges 62 of the several blades 58.

It should be understood that the foregoing is merely illustrative of a certain embodiment of the invention and many variations may be made by those skilled in the art without departing from the spirit and scope of the invention.

Now therefore, we claim:

1. A high-speed slicer comprising:
   (a) a housing having an interiorly disposed continuous surface which is a substantially complete and continuous surface of revolution about a center axis of said housing and which defines a chamber having a discharge opening at one end thereof, which discharge opening is spaced axially from said surface of revolution,
   (b) a feed opening formed in said housing and extending through said surface,
   (c) feed means to move material to be sliced through said feed opening and into said chamber,
   (d) a cutter frame mounted for rotary motion within said surface about an axis of rotation coincident with said center axis of said housing, said frame having a plurality of outwardly extending arm means,
   (e) means to rotate said frame about its axis of rotation,
   (f) a plurality of blades, each of which has a mounting end and a cutting end and is pivotally connected at its mounting end to a related arm means in a manner to be able to swing outwardly with its cutting end extending forwardly from its mounting end to be in substantially continuous engagement with said interiorly disposed surface as it travels through an entire revolution within said surface.

2. The apparatus as recited in claim 1, wherein each of said blades has spring means operatively connected between its related arm means and blade to urge its related blade outwardly against said surface.

3. A high-speed slicer comprising:
   (a) a housing having an interiorly disposed continuous surface which is a substantially complete and continuous surface of revolution about a center axis of said housing and which defines a chamber having a discharge opening at one end thereof, which discharge opening is spaced axially from said surface of revolution,
   (b) a feed opening formed in said housing and extending through said surface,
   (c) feed means to move material to be sliced through said feed opening and into said chamber,
   (d) a cutter frame mounted for rotary motion within said surface about an axis of rotation coincident with the axis of rotation of said housing,
   (e) means to rotate said frame about its axis of rotation, and
   (f) at least one blade, said blade having a mounting end and a cutting end and being connected at its mounting end to said frame in a manner to be able to swing outwardly with its cutting end extending forwardly of its mounting end to be in substantially continuous engagement with said interiorly disposed surface as it travels through an entire revolution within said surface.

4. The apparatus as recited in claim 3, wherein said blade has spring means operatively connected between said blade and said frame to urge said blade outwardly against said surface.

References Cited by the Examiner

UNITED STATES PATENTS

| 887,339 | 5/1908 | Morrell | 83—350 X |
|---|---|---|---|
| 939,895 | 11/1909 | Dobbs | 83—355 X |
| 1,764,202 | 6/1930 | Dreyfus | 83—355 |
| 2,370,952 | 3/1945 | Gordon | 18—12 X |
| 2,631,668 | 3/1953 | Wicker. | |

WILLIAM W. DYER, JR., *Primary Examiner.*

ANDREW R. JUHASZ, *Examiner.*